United States Patent
Sung et al.

(10) Patent No.: US 9,936,247 B2
(45) Date of Patent: *Apr. 3, 2018

(54) METHOD AND APPARATUS FOR REQUESTING DATA, AND METHOD AND APPARATUS FOR OBTAINING DATA

(71) Applicant: Samsung Electronics Co., Ltd., Gyeonggi-do (KR)

(72) Inventors: Ju-yun Sung, Gyeonggi-do (KR); Hee-jeong Choo, Gyeonggi-do (KR); Keum-koo Lee, Gyeonggi-do (KR); Ji-young Kwahk, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/443,743

(22) Filed: Feb. 27, 2017

(65) Prior Publication Data
US 2017/0171608 A1     Jun. 15, 2017

Related U.S. Application Data

(60) Continuation of application No. 14/937,441, filed on Nov. 10, 2015, now Pat. No. 9,602,867, which is a
(Continued)

(30) Foreign Application Priority Data

Aug. 21, 2009  (KR) .................. 10-2009-0077877
Aug. 16, 2010  (KR) .................. 10-2010-0078783

(51) Int. Cl.
G06F 3/00       (2006.01)
H04N 21/436     (2011.01)
(Continued)

(52) U.S. Cl.
CPC ... *H04N 21/43615* (2013.01); *H04N 21/4126* (2013.01); *H04N 21/4223* (2013.01); *H04N 21/4363* (2013.01)

(58) Field of Classification Search
CPC .................................. G06F 3/00; G06F 15/00
(Continued)

(56) References Cited

U.S. PATENT DOCUMENTS 6,005,599 A    12/1999  Asai et al.
6,026,232 A     2/2000  Yogeshwar
(Continued)

FOREIGN PATENT DOCUMENTS

CN    1609844     4/2005
EP    1 524 839   4/2005
(Continued)

OTHER PUBLICATIONS

Naohiko Kohtake et al., "StateSnap: A Snapshot-based interface for State-Reproductable Manipulation of Information Appliances", vol. 6, No. 4, 2004.
(Continued)

*Primary Examiner* — Christopher Shin
(74) *Attorney, Agent, or Firm* — The Farrell Law Firm, P.C.

(57) ABSTRACT

Disclosed herein are methods and apparatuses for requesting and obtaining data, in which time information is generated by use of a first device, and a data request command requesting data output by a second device is generated at a time point indicated by the time information. The generated data request command is transmitted, wherein the data request command includes the time information.

19 Claims, 6 Drawing Sheets

Related U.S. Application Data division of application No. 12/861,512, filed on Aug. 23, 2010, now abandoned.

(51) Int. Cl.
*H04N 21/41* (2011.01)
*H04N 21/4223* (2011.01)
*H04N 21/4363* (2011.01)
*G06F 15/00* (2006.01)

(58) Field of Classification Search
USPC .................... 710/5, 37; 709/217; 715/723
See application file for complete search history.

(56) References Cited

U.S. PATENT DOCUMENTS

| | | |
|---|---|---|
| 6,523,334 B1 | 2/2003 | Dettmann |
| 7,905,834 B2 | 3/2011 | Watanabe et al. |
| 7,958,530 B2 | 6/2011 | Fukuda et al. |
| 2002/0080276 A1 | 6/2002 | Mori et al. |
| 2003/0063575 A1 | 4/2003 | Kinjo |
| 2003/0190148 A1 | 10/2003 | Lee |
| 2004/0024610 A1 | 2/2004 | Fradkov et al. |
| 2004/0205825 A1 | 10/2004 | Kawabe et al. |
| 2004/0244055 A1 | 12/2004 | Takada et al. |
| 2005/0094178 A1 | 5/2005 | Anno |
| 2005/0122391 A1 | 6/2005 | Fukuda et al. |
| 2005/0183018 A1 | 8/2005 | Shinkai et al. |
| 2007/0282976 A1 | 12/2007 | Matsuda |
| 2008/0101769 A1 | 5/2008 | Lee |
| 2008/0141074 A1 | 6/2008 | Noumi |
| 2012/0030314 A1 | 2/2012 | Kim et al. |
| 2016/0066030 A1* | 3/2016 | Sung ................ H04N 7/17318 725/80 |

FOREIGN PATENT DOCUMENTS

| | | |
|---|---|---|
| EP | 1 542 452 | 6/2005 |
| JP | 2003-178221 | 6/2003 |
| JP | 2004-326762 | 11/2004 |
| JP | 2005-175715 | 6/2005 |
| JP | 2006-085392 | 3/2006 |
| JP | 2008-005250 | 1/2008 |
| KR | 10-0610371 | 1/2006 |
| WO | WO 00/10327 | 2/2000 |

OTHER PUBLICATIONS

Japanese Final Rejection dated Mar. 2, 2015 issued in counterpart application No. 2010-186290.
Japanese Office Action dated Oct. 5, 2015 issued in counterpart application No. 2010-186290, 5 pages.
Korean Office Action dated May 10, 2016 issued in counterpart application No. 10-2010-0078783, 15 pages.

* cited by examiner

| OPERATION MODE | DESCRIPTION |
|---|---|
| PHOTOGRAPHING MODE (610) | PHOTOGRAPH SUBJECT |
| CAPTURE MODE (620) | REQUEST FOR CAPTURING |
| SEARCH MODE (630) | REQUEST FOR SEARCH |
| ADDITIONAL INFORMATION OBTAINING MODE (640) | REQUEST FOR ADDITIONAL INFORMATION TRANSMISSION |

| COMMAND IDENTIFIER (710) | TIME INFORMATION (720) | OBJECT AREA INFORMATION (730) | FORMAT INFORMATION (740) | PERIPHERAL DEVICE INFORMATION (750) |
|---|---|---|---|---|

METHOD AND APPARATUS FOR REQUESTING DATA, AND METHOD AND APPARATUS FOR OBTAINING DATA

PRIORITY

This application is a Continuation Application of U.S. patent application Ser. No. 14/937,441, filed on Nov. 10, 2015, which is a Divisional Application of U.S. patent application Ser. No. 12/861,512, filed on Aug. 23, 2010, and claims priority under 35 U.S.C. § 119(a) to Korean Patent Application No. 10-2009-0077877, filed in the Korean Intellectual Property Office on Aug. 21, 2009, and Korean Patent Application No. 10-2010-0078783, filed in the Korean Intellectual Property Office on Aug. 16, 2010, the contents of each of which are incorporated herein by reference.

BACKGROUND OF THE INVENTION

1. Field of the Invention

The present invention relates generally to methods and apparatuses for requesting and obtaining data, and more particularly, to a data requesting apparatus including an image pickup unit and a method of requesting data using the data requesting apparatus, and a data obtaining apparatus including an output unit and a method of obtaining data by using the data obtaining apparatus.

2. Description of the Related Art

Due to the evolution of information technology, communication between at least two devices has become a normal occurrence. In addition, a home network has been realized, in which data or control commands may be transmitted between devices.

The home network enables efficient data sharing in that contents stored in one device can be used by another device, and functions provided in one device can also be provided in another device, and thus various functions may be used.

However, absent in the prior art is an efficient apparatus and method for data requesting and data obtaining in a home network. For example, when a data obtaining apparatus is a TeleVision that outputs sixty (60) image frames per second, it is difficult for a data obtaining apparatus in the prior art to accurately search for the desired data by only using time information.

SUMMARY OF THE INVENTION

In order to solve the foregoing problems in the prior art, one the present invention provides methods and apparatuses for requesting and obtaining data in a home network.

According to an aspect of the present invention, there is provided a data requesting method performed in a first device, the method including generating time information at the first device, generating a data request command requesting data output by a second device, at a time point indicated by the time information, and transmitting the generated data request command, wherein the data request command includes the time information.

The data requesting method further includes forming an image of the second device by using an image pickup unit included in the first device, wherein the time information indicates a time when the second device is photographed.

The generating a data request command includes determining an operation mode of the first device, and generating the data request command when the operation mode is a capture mode.

Determining the operation mode of the first device further includes determining whether the photographed second device includes an output unit, and determining the operation mode to be a capture mode when the second device includes an output unit.

The data request command further includes image data of the second device photographed by using the image pickup unit, and information of a third device to which the requested data is to be transmitted.

The data requesting method further includes receiving pieces of data output by the second device within a period of time from the time point indicated by the time information.

According to another aspect of the present invention, there is provided a data obtaining method performed in a second device, the method including outputting data, receiving a data request command including time information, from a first device, and obtaining the data output by the second device at a time point indicated by the time information.

The data request command is generated when an image pickup unit included in the first device forms an image of the second device, and further includes image data of the second device formed by using the image pickup unit, and information about a third device to which the requested data is to be transmitted.

The data obtaining method further includes storing the output data transmitting the obtained data to the third device, and transmitting the obtained plurality pieces of data output by the second device to the first device, wherein the obtaining is further performed by searching for the stored data based on the time information, and obtaining pieces of data output by using the second device within a period of time from the time point indicated by the time information.

The obtaining further includes requesting an external device for the requested data based on the time information, and receiving the requested data from the external device.

According to another aspect of the present invention, there is provided a data requesting apparatus including a time information generating unit for generating time information, a request command generating unit for generating a data request command that requests data output by a second device at a time point indicated by the time information, and a transmitter for transmitting the generated data request command, wherein the data request command includes the time information.

According to another aspect of the present invention, there is provided a data obtaining apparatus including an output unit for outputting data, a receiver for receiving a data request command including time information from a first device, and an obtaining unit for obtaining data output by the output unit at a time point indicated by the time information.

BRIEF DESCRIPTION OF THE DRAWINGS

The above and other features and advantages of the present invention will become more apparent by describing in detail embodiments thereof with reference to the attached drawings in which.

DETAILED DESCRIPTION OF THE INVENTION

Figure 1:
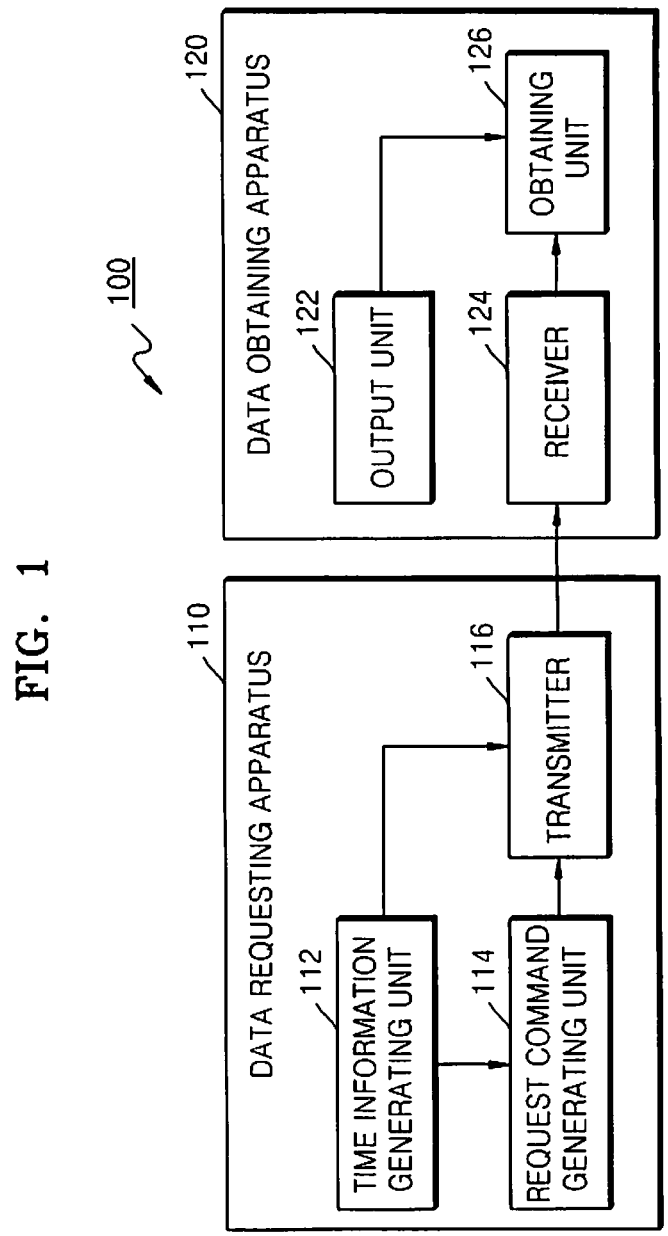
FIG. 1 illustrates a data obtaining system according to a first embodiment of the present invention.

Hereinafter, embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted for the sake of clarity and conciseness.

FIG. 1 illustrates a data obtaining system according to a first embodiment of the present invention.

Referring to FIG. 1, the data obtaining system 100 includes a data requesting apparatus 110 and a data obtaining apparatus 120.

The data requesting apparatus 110 communicates with other apparatuses and may be, for example, a remote controller, a mobile phone, a camera, or a camcorder. The data obtaining apparatus 120 includes an output unit for outputting data and may be, for example, a TeleVision (TV), a computer, a Personal Digital Assistant (PDA), or a mobile phone.

The data requesting apparatus 110 includes a time information-generating unit 112, a request command-generating unit 114, and a transmitter 116.

The time information-generating unit 112 generates time information that is necessary for requesting data. A time of the data requesting apparatus 110 is preferably synchronized with a time of the data obtaining apparatus 120.

The time information-generating unit 112 generates time information of a time point when a user input is received via an interface unit (not shown) of the data requesting apparatus 110. For example, when the data requesting apparatus 110 is a remote controller, the button of which a user presses, the time information-generating unit 112 generates time information of a time point when the button is pressed. In another example, when the data requesting apparatus 110 is a camera, and a user presses a button to activate the camera shutter, the time information-generating unit 112 generates time information of a time point when the shutter is pressed.

The request command-generating unit 114 generates a data request command, which includes the time information generated by the time information generating unit 112, and is used to request for data output by the data obtaining apparatus 120 at a time point indicated by the time information.

The data request command includes any type of data that is needed to specify data requested by the data requesting apparatus 110.

For example, the data request command includes image data of an output unit 122 of the data obtaining apparatus 120 obtained by photographing the output unit 122 when data is output by the output unit 122. Also, when data is to be transmitted to a third device, the data request command includes identification of the third device to which data is to be transmitted. An example of the data request command will be described later with reference to FIG. 7.

The transmitter 116 transmits a data request command. When image data that is obtained by photographing the data obtaining apparatus 120 is not included in the data request command, the transmitter 116 separately transmits the obtained image data. The transmitter 116 transmits the data request command to the data obtaining apparatus 120 or an external server (not shown).

The data requesting apparatus 110 further includes a receiver (not shown) which receives data from the data obtaining apparatus 120 or an external server (not shown). The receiver receives a plurality of pieces of data that are output by the output unit 122 of the data obtaining apparatus 120 within a period of time from a time point indicated by the time information. When the data obtaining apparatus 120 is a TV that outputs sixty (60) image frames per second, it is difficult for the data obtaining apparatus 120 to accurately search for data desired by the data requesting apparatus 110 just by using the time information. In order to solve this problem, the data obtaining apparatus 120 searches for a plurality of pieces of data output by the output unit 122 within a period of time from a time point indicated by the time information and transmits the pieces of data to the data requesting apparatus 110 so that the user may obtain desired data.

The data obtaining apparatus 120 includes the output unit 122, a receiver 124, and an obtaining unit 126.

The output unit 122 outputs data, and includes at least an image output unit for outputting image data (e.g., a Liquid Crystal Display (LCD), not shown) or a voice output unit for outputting voice data (e.g., a speaker, not shown). The receiver 124 receives a data request command including time information from the data requesting apparatus 110.

The obtaining unit 126 obtains data output by the output unit 122, based on time information, at a time point indicated by the time information. When the data output by the output unit 122 is stored in the data obtaining apparatus 120, the obtaining unit 126 searches for the stored data to obtain data desired by the data requesting apparatus 110. When the data output by the output unit 122 is not stored in the data obtaining apparatus 120 or data desired by the data requesting apparatus 110 does not exist after searching for the same, the obtaining unit 126 requests the external server for data.

The obtaining unit 126 includes a plurality of pieces of data that are output by the output unit 122 within a period of time from a time point indicated by the time information and transmits the pieces of data to the data requesting apparatus 110.

Figure 2:
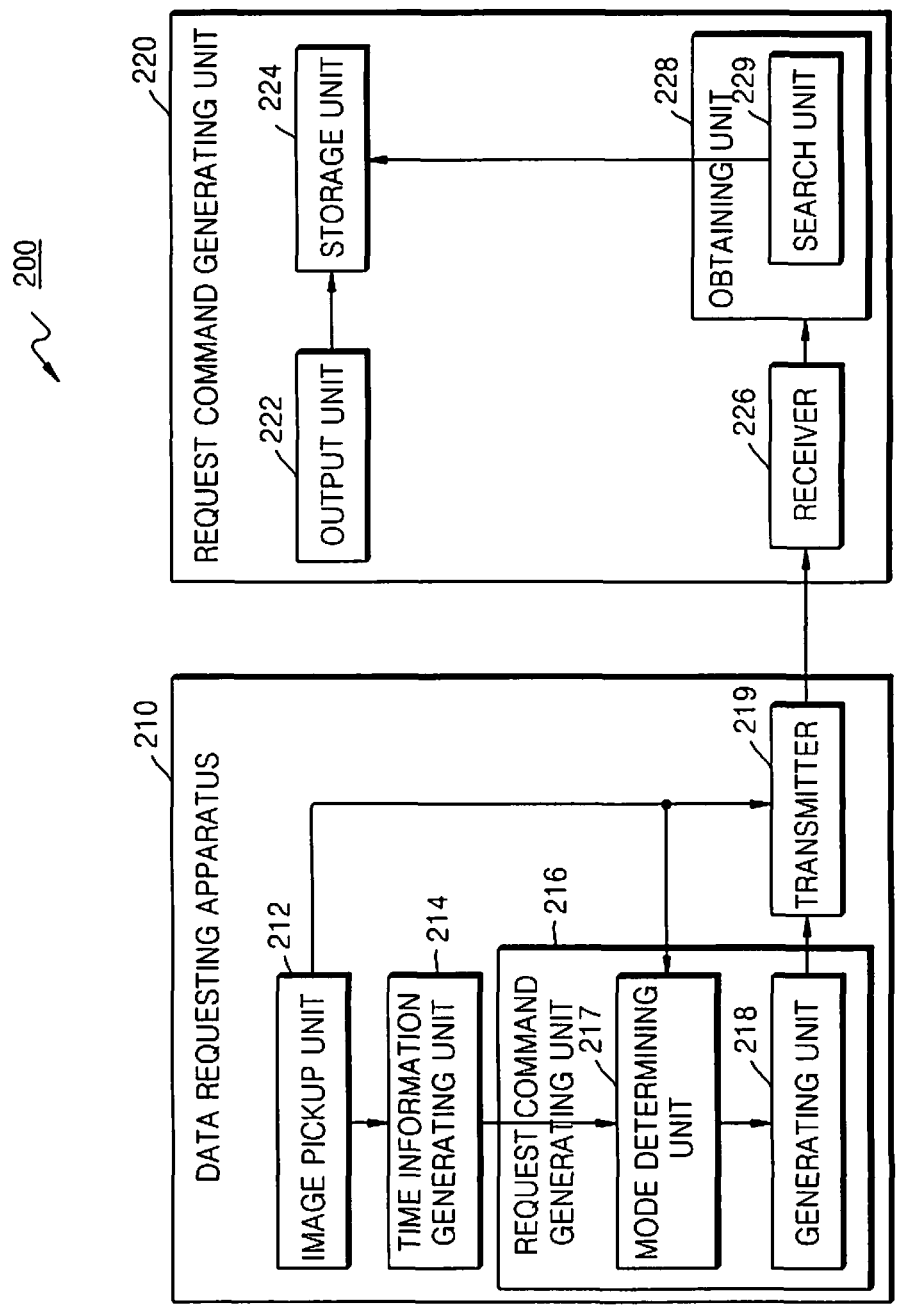
FIG. 2 illustrates a data obtaining system according to a second embodiment of the present invention.

FIG. 2 illustrates a data obtaining system 200 according to a second embodiment of the present invention, and describes an example in which a data requesting apparatus 210 including an image pickup unit 212 requests data.

The data requesting apparatus 210 includes the image pickup unit 212, a time information-generating unit 214, a request command-generating unit 216 and a transmitter 219. The image pickup unit 212 forms an image of a subject. The time information-generating unit 214 generates time information indicating time when the image pickup unit 212 forms an image of the subject. The request command-generating unit 216 includes a mode-determining unit 217 and a generating unit 218.

The mode-determining unit 217 determines an operation mode of the data requesting apparatus 210, which is variable. For example, the operation mode may be divided into a photographing mode and a capture mode. The photographing mode is used to photograph a subject of which an image is formed on the image pickup unit 212, and the capture mode is used to request a device, the image of which being formed on the image pickup unit 212.

For example, when the data requesting apparatus 210 is in the photographing mode, and the image pickup unit 212 forms an image of a TV, image data of the TV is obtained. When the data requesting apparatus 210 is in the capture mode, and the image pickup unit 212 forms an image of the TV, image data output by the TV is requested to the TV (or an external server).

The mode-determining unit 217 determines an operation mode of the data requesting apparatus 210 according to various standards. Hereinafter, three standards for determining an operation mode of the data requesting apparatus 210 will be described, but the standards are not limited thereto.

According to a first embodiment, the user is induced to set an operation mode of the data requesting apparatus 210. When power is applied to the data requesting apparatus 210, or when the image pickup unit 212 forms an image of a subject, an inquiry window is output so that the user may set an operation mode of the data requesting apparatus 210.

According to a second embodiment, the mode-determining unit 217 analyzes the subject, an image of which is formed by the image pickup unit 212 to determine the operation mode of the data requesting apparatus 210. When the subject photographed by the image pickup unit 212 includes the output unit 222, the operation mode of the data requesting apparatus 210 is determined as a capture mode. If strict standards are applied, the operation mode of the data requesting apparatus 210 is determined as a capture mode only when the image pickup unit 212 forms an image of the output unit 222.

According to the second embodiment, it is assumed that the operation mode of the data requesting apparatus 210 is determined as a capture mode only when the image pickup unit 212 forms an image of the output unit 222, but according another embodiment, the operation mode of the data requesting apparatus 210 may be determined as a capture mode also when the user does not press a shutter, which indicates that a subject is not being photographed.

According to a third embodiment, when set conditions are satisfied, the operation mode of the data requesting apparatus 210 is determined as a capture mode. For example, when the data requesting apparatus 210 and a data obtaining apparatus 220 are connected via a communications network, and the output unit 222 is focused to the image pickup unit 212 for a period of time or longer, the operation mode of the data requesting apparatus 210 is determined as a capture mode.

As described above, by setting an apparatus providing functions so as to operate in a capture mode under set conditions, the number of devices to which the methods of the present invention may be applied may be increased.

The operation mode of the data requesting apparatus 210 will be described in detail later with reference to FIG. 4.

When the operation mode of the data requesting apparatus 210 is determined as a capture mode, the generating unit 218 generates a data request command as described above. That is, when the operation mode of the data requesting apparatus 210 is a photographing mode, the generating unit 218 generates a data request command only when the operation mode of the data requesting apparatus 210 may be determined as a capture mode, instead of generating a data request command.

Image data of the data obtaining apparatus 220 formed by the image pickup unit 212 is included in a data request command. When desired data is output by the output unit 222 of the data obtaining apparatus 220, the user photographs the output unit 222 by using the image pickup unit 212. The generating unit 218 inserts the image data obtained by photographing the output unit 222 into a data request command, thereby enabling a simple search of data for the data requesting apparatus 220.

The transmitter 219 transmits the data request command to a receiver 226 in the data obtaining apparatus 220. When the data requesting apparatus 210 and the data obtaining apparatus 220 are directly connected to each other as illustrated in FIG. 2, the transmitter 219 transmits the data request command to the data obtaining apparatus 220. However, when the data requesting apparatus 210 and the data obtaining apparatus 220 are connected via a server 410 as illustrated in FIG. 4, the transmitter 219 transmits the data request command to the server.

The data obtaining apparatus 220 includes the output unit 222, a storage unit 224, the receiver 226, and an obtaining unit 228. The output unit 222 outputs data, the storage unit 224 stores the output data, and the receiver 226 receives a data request command from the data requesting apparatus 210.

The obtaining unit 228 obtains the data output by the output unit 222 at a time point indicated by the time information. The obtaining unit 228 obtains data in the data obtaining apparatus 220 or from the external server.

The obtaining unit 228 includes a search unit 229 when the obtaining unit 228 obtains data in the data obtaining apparatus 220.

The search unit 229 searches for data stored in the storage unit 224 based on the time information included in the data request command. When the image data of the data obtaining apparatus 220 is included in the data request command, the search unit 229 compares the image data included in the data request command with the stored image data.

When the obtaining unit 228 obtains data from the external server, the obtaining unit 228 includes a requesting unit (not shown) and a receiver (not shown).

The requesting unit determines which data is output by the output unit 222 at a time point indicated by the time information based on the time information included in the data request command. The requesting unit transmits data that is needed to specify the output data to the external server (not shown). For example, the requesting unit may transmit data identification information (e.g., identifiers of contents, or program identifiers) and a frame number (or time information) of requested data to the external server (not shown).

The requesting unit receives data in response to a request of the requesting unit.

Figure 3:
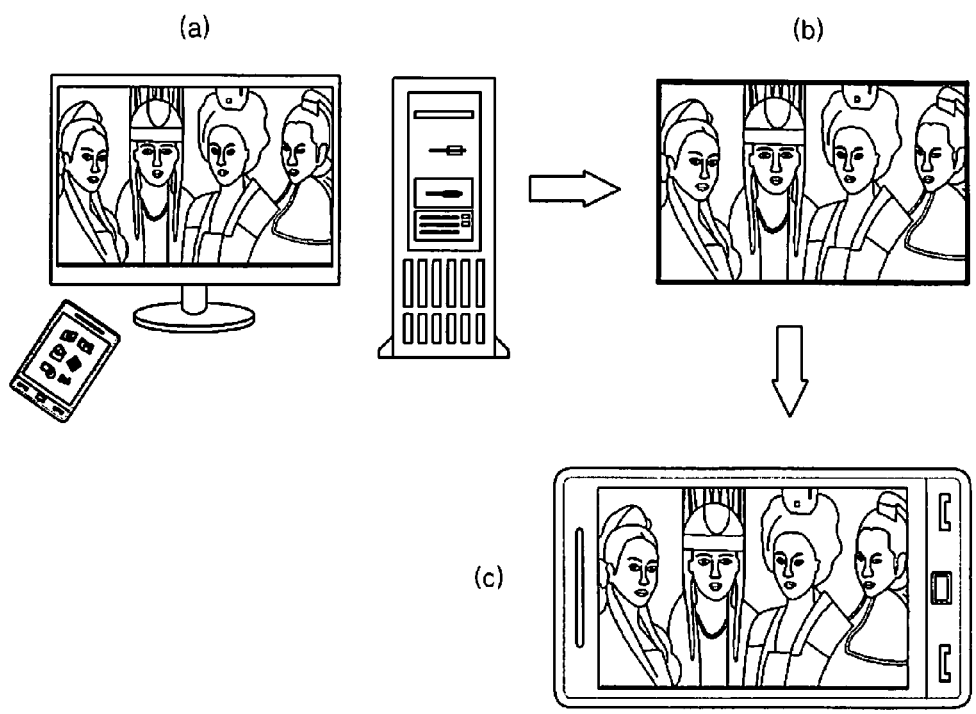
FIG. 3 illustrates an operation of obtaining data according to an embodiment of the present invention.

FIGS. 3A through 3C illustrate an operation of obtaining data according to an embodiment of the present invention. In FIG. 3, a data requesting apparatus is a mobile phone 310 including a camera, and a data obtaining apparatus is a desktop computer 320 having a display unit.

In FIG. 3A, the user photographed the desktop computer 320 by using the camera included in the mobile phone 310. The mobile phone 310 generates a data request command including time information indicating a photographing time, and transmits the data request command to the desktop computer 320.

In FIG. 3B, the desktop computer 320 obtains image data output by the display unit thereof at the time point indicated by the time information. The desktop computer 320 may obtain data requested by the mobile phone 310 by capturing a screen output on the display unit or by searching a storage space of the desktop computer 320.

In FIG. 3C, the mobile phone 310 receives image data from the desktop computer 320.

Figure 4:
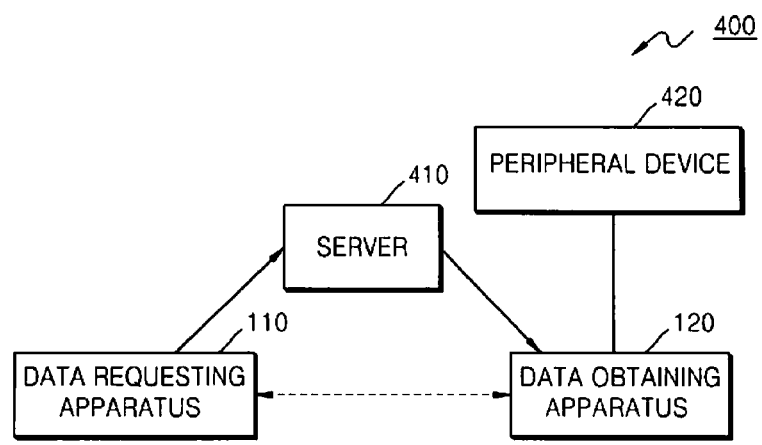
FIG. 4 illustrates a network system according to an embodiment of the present invention.

FIG. 4 illustrates a network system 400 according to an embodiment of the present invention.

In the network system 400, the data requesting apparatus 110 and the data obtaining apparatus 120 are connected via the server 410. However, a peripheral device 420 is directly connected to the data obtaining apparatus 120.

The data requesting apparatus 110 and the network system 400 may be a small-size network such as a home network system, a large-size network such as a High-Speed Downlink Packet Access (HSDPA), or a Wibro network. Both the data requesting apparatus 110 and the data obtaining apparatus 120 may be registered to the server 410, and are able to communicate with each other only inside the network system 400. However, the data obtaining apparatus 120 may communicate directly with the peripheral device 420.

Figure 5:
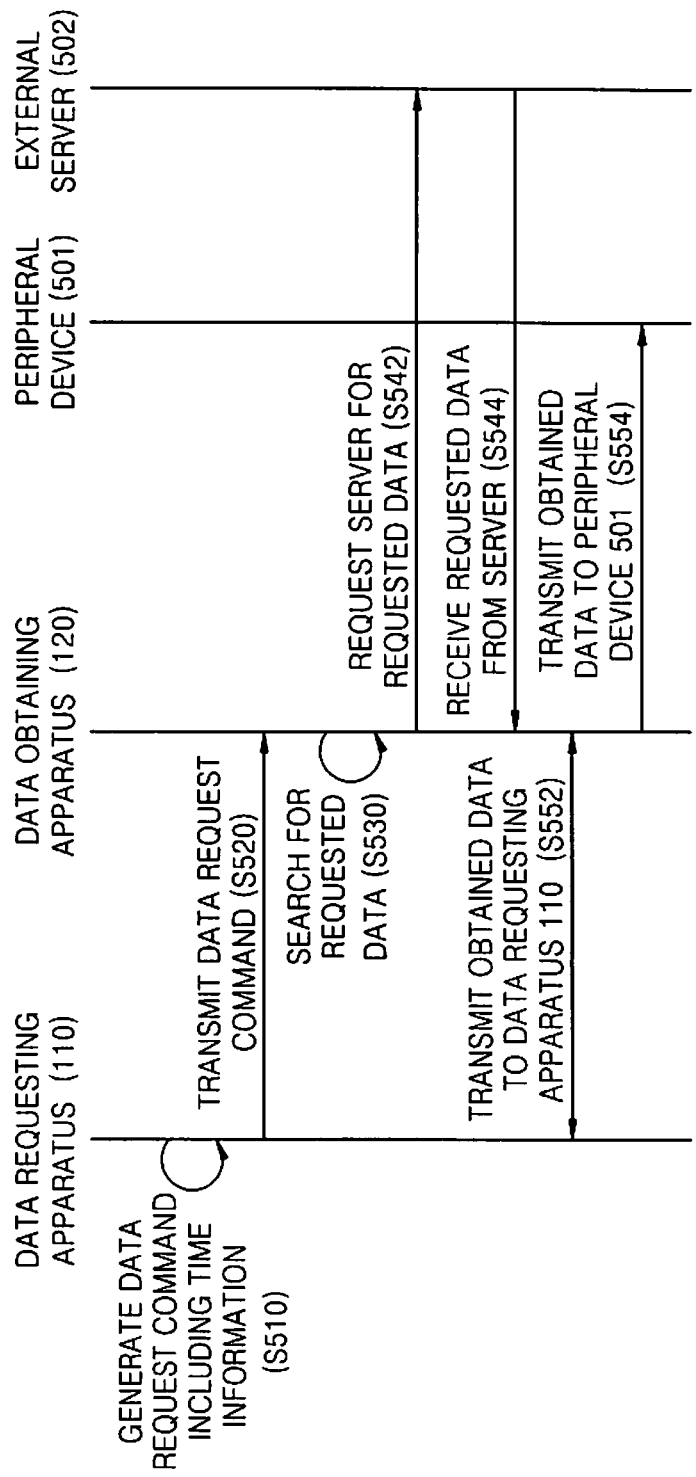
FIG. 5 illustrates a data obtaining system according to an embodiment of the present invention.

FIG. 5 illustrates a data obtaining system according to an embodiment of the present invention.

In operation S510, the data requesting apparatus 110 generates a data request command including time information. The data request command requests for data output by the output unit 122 of the data obtaining apparatus 120 at a time point indicated by the time information.

In operation S520, the data requesting apparatus 110 transmits the data request command to the data obtaining apparatus 120.

In operation S530, the data obtaining apparatus 120 searches a database for the data output by the output unit of the data obtaining apparatus 120 at the time point indicated by the time information.

In operation S542, the data obtaining apparatus 120 requests an external server 502 for data that is requested by the data requesting apparatus 110.

In operation S544, the data obtaining apparatus 120 receives the data requested by the data requesting apparatus 110 from the external server 502.

Operations S542 through S544 may not be performed when desired data is detected in operation S530.

In operation S552, the obtained data is transmitted to the data requesting apparatus 110. When a peripheral device 501 to which the obtained data is to be transmitted is designated in the data request command, operation S554 is performed. In operation S554, the data obtaining apparatus 120 transmits the obtained data to the peripheral device 501.

Figures 6, 7:
FIG. 6 illustrates an example of an operation mode of a data requesting apparatus according to an embodiment of the present invention.
FIG. 7 illustrates a data structure of a data request command, according to an embodiment of the present invention.

FIG. 6 illustrates examples of an operation mode of a data requesting apparatus 210 according to an embodiment of the present invention. The Table illustrated in FIG. 6 may be displayed when the user requests for information regarding the operation mode of the data requesting apparatus 210.

The data requesting apparatus 210 operates in one of a photographing mode 610, a capture mode 620, a search mode 630, and an additional information obtaining mode 640, and the user may modify a mode by manipulating a scroll or a touch screen attached to the data requesting apparatus 210. According to embodiments, buttons corresponding to each of the modes may be attached on a surface of the data requesting apparatus 210 so that modes are changed upon pressing a desired button.

In this specification, it is assumed that the user sets an operation mode and then presses an operation-initiating button, such as a camera shutter, and the data requesting apparatus 210 operations in the set mode. However, the data requesting apparatus 210 may operate in a mode that is concurrently set when an image is formed on the image pickup unit 212 or when the user presses one of the buttons corresponding to the modes.

In the photographing mode 610, a subject is photographed and an image of the subject is formed on the image pickup unit 212. While the operation mode of the data requesting apparatus 210 is set as the photographing mode, the user presses the operation-initiating button, and the image pickup unit 212 obtains data of the image of the subject that is formed on the image pickup unit 212. For example, while an image of a TV is formed on the image pickup unit 212, the user presses the operation-initiating button, and thus image data of the TV is obtained.

In the capture mode 620, data output by a device of which an image is formed on the image pickup unit 212 is requested. While the operation mode of the data requesting apparatus 210 is set as the photographing mode, the user presses the operation initiating button, and thus a data request command for requesting data output by an output unit of a subject at a time point when the operation initiating button is pressed is generated. For example, while an image of a TV is formed on the image pickup unit 212, the user presses the operation-initiating button, and thus a request command for requesting data output by the TV is generated. The TV that has received the request command obtains the requested data and transmits the same to the data requesting apparatus 210.

In the search mode 630, a search is performed for information related to objects or characters of which an image is formed on the image pickup unit 212. While the operation mode of the data requesting apparatus 210 is set as the search mode 630, the user presses the operation-initiating button, and thus the search is performed for information related to objects or characters of which an image is formed on the image pickup unit 212. For example, while an image of a word 'Star' or an image of a 'Star' relay is formed on the image pickup unit 212, the user presses the operation-initiating button, and thus information related to the 'Star' is searched for with a search engine. A search range may be determined by the user in advance. The found information may be transmitted to the data requesting apparatus 210 or a peripheral device (not shown).

In the additional information-obtaining mode 640, metadata about data output by a device of which an image is formed on the image pickup unit 212 is obtained. While the operation mode of the data requesting apparatus 210 is set as the additional information obtaining mode 640, the user presses the operation-initiating button, and thus metadata of data output by a device of which an image is formed on the image pickup unit 212 is obtained. For example, while an image of a TV is formed on the image pickup unit 212, the user presses the operation-initiating button, and thus a requesting signal for requesting metadata about a broadcasting program output by the current TV is generated. A TV or a broadcasting server that has received the requesting signal obtains the metadata such as Electronic Programming Guide (EPG) information and transmits the same to the data requesting apparatus 210 or stores the same in the TV or the broadcasting server.

FIG. 7 illustrates a data structure of a data request command 700, according to an embodiment of the present invention.

The data request command 700 may include any information specifying data requested by the data requesting apparatus 110.

The data request command 700 is formed of a command identifier 710, time information 720, object area information 730, format information 740, and peripheral device information 750.

The command identifier 710 denotes types of the data request command 700.

The time information 720 indicates a time point when desired data is output by the data obtaining apparatus 120. A time of the data requesting apparatus 110 is preferably synchronized with a time of the data obtaining apparatus 120. The data obtaining apparatus 120 detects which data is output at a time point indicated by the time information 720 and searches for corresponding data. The object area information 730 is information indicating desired data area. The data obtaining apparatus 120 may search for an image frame to be captured, based on time information 720, and then capture a specific area within an image frame based on object area information 730. The format information 740 includes data format information desired by the data requesting apparatus 110. For example, the format information 740 may include at least one of a data resolution, a data size, a data format, and encoding information.

The peripheral device information 750 indicates information about peripheral devices to which requested data is to be transmitted. After obtaining data requested by the data requesting apparatus 110, the data obtaining apparatus 120 transmits the obtained data to a peripheral device indicated by the peripheral device information 750.

Figure 8:
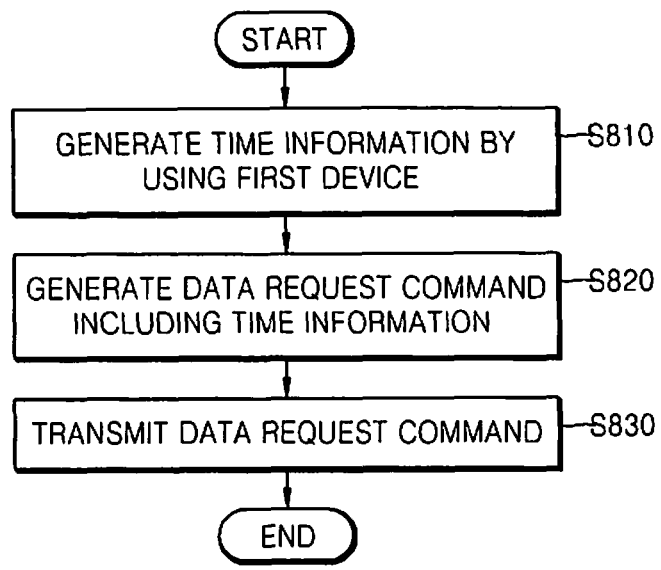
FIG. 8 illustrates a method of requesting data, according to an embodiment of the present invention.

FIG. 8 illustrates a method of requesting data, according to an embodiment of the present invention.

In operation S810, a first device requesting data generates time information that denotes a time point when a user input signal is generated, such as when the user photographs a subject or presses an interface.

In operation S820, a data request command requesting data output by a second device is generated at the point indicated by the time information. The data request command may be generated when an operation mode of the first device is a capture mode.

The data request command may include image data of the second device, identification information of a third device to which requested data is to be transmitted, or other information. In operation S830, the first device transmits the data request command to the second device.

Figure 9:
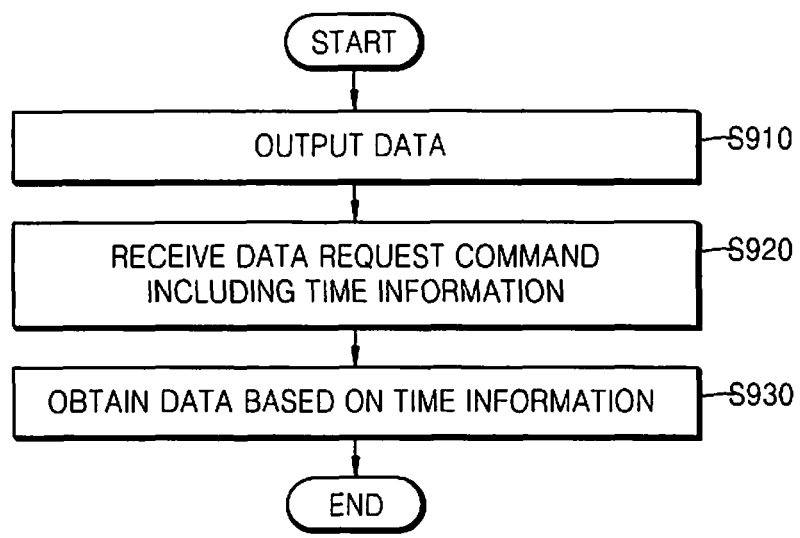
FIG. 9 illustrates a method of obtaining data, according to an embodiment of the present invention.

FIG. 9 illustrates a method of obtaining data, according to an embodiment of the present invention.

In operation S910, a second device outputs data. In operation S920, the second device receives a data request command including time information, from a first device. In operation S930, the second device obtains data output by the second device at a time point indicated by the time information based on the time information.

The embodiments of the present invention can be written as computer programs and can be implemented in general-use digital computers that execute the programs using a computer readable recording medium.

Examples of the computer readable recording medium include Read-Only Memory (ROM), Random-Access Memory (RAM), CD-ROMs, magnetic tapes, floppy disks, and optical data storage devices.

While this invention has been particularly shown and described with reference to embodiments thereof, it will be understood by those skilled in the art that various changes in form and details may be made therein without departing from the spirit and scope of the invention as defined by the appended claims. The embodiments should be considered in descriptive sense only and not for purposes of limitation.

Therefore, the scope of the invention is defined not by the detailed description of the invention but by the appended claims, and all differences within the scope will be construed as being included in the present invention.

What is claimed is:

1. A method performed in a second device, the method comprising:
   establishing communication with a first device;
   displaying multimedia data of the second device on a screen of the second device;
   receiving, from the first device, a request for data related to the multimedia data, the request including information for identifying the data; and
   in response to the request, transmitting the data related to the multimedia data to the first device,
   wherein the information for identifying the data is generated in the first device while the multimedia data is displayed on the screen of the second device, and
   wherein the first device is capable of displaying the data related to the multimedia data.

2. The method of claim 1, wherein the data is obtained from the multimedia data.

3. The method of claim 1, wherein the request is generated by the first device in response to the first device receiving a user input for capturing an image of the multimedia data output in the second device.

4. The method of claim 3, wherein the request includes the captured image of the multimedia data output in the second device and time information indicating a time at which the image was captured.

5. The method of claim 4, further comprising storing the output multimedia data,
   wherein obtaining the data comprises searching for the data from the stored output multimedia data based on the time information included in the request.

6. The method of claim 5, wherein searching for the data comprises searching for the data from the stored output multimedia data based on the captured image included in the request.

7. The method of claim 1, wherein the request further includes information about a third device to which the data is to be transmitted.

8. The method of claim 4,
   wherein a plurality of frames of the multimedia data output by the second device are obtained within a period of time from the time indicated by the time information.

9. The method of claim 2, wherein obtaining the data comprises:
   requesting the data from an external device based on the information for identifying the data requested by the first device; and
   receiving the data from the external device.

10. An apparatus, comprising:
    a communication interface configured to establish communication with a first device;
    a screen configured to provide multimedia data of the first device;
    a processor configured to:
       receive a request for data related to the multimedia data from the first device, the request including information for identifying the data, and
       in response to the request, transmitting the data related to the multimedia data,
    wherein the information for identifying the data is generated in the first device, and wherein the first device is capable of displaying the data related to the multimedia data.

11. The apparatus of claim 10, wherein the processor is further configured to obtain the data from the multimedia data.

12. The apparatus of claim 10, wherein the request is generated by the first device in response to the first device receiving a user input for capturing an image of the multimedia data output in the apparatus.

13. The apparatus of claim 12, wherein the request includes the captured image of the multimedia data and time information indicating a time at which the image was captured.

14. The apparatus of claim 13, further comprising a storage configured to store the output multimedia data,
wherein the processor is further configured to search for the data from the stored output multimedia data based on the time information included in the request.

15. The apparatus of claim 14, wherein the processor is further configured to search for the data from the stored output multimedia data based on the captured image included in the request.

16. The apparatus of claim 10, wherein the request further includes information about a second device to which the data is to be transmitted, and
wherein the communication interface is configured to transmit the data to the second device.

17. The apparatus of claim 13, wherein the processor is further configured to obtain frames of the multimedia data output by the display within a period of time from the time indicated by the time information, and
wherein the communication interface transmits the obtained frames to the first device.

18. The apparatus of claim 10, wherein the processor is further configured to request the data from an external device based on the information for identifying the data, and receive the data from the external device.

19. A non-transitory computer readable recording medium having embodied thereon a program for executing a method comprising:
displaying multimedia data of a second device on a screen of the second device;
receiving, from a first device, a request for data related to the multimedia data, the request including information for identifying the data; and
in response to the request, transmitting the data related to the multimedia data to the first device,
wherein the information for identifying the data is generated in the first device while the multimedia data is displayed on the screen of the second device, and
wherein the first device is capable of displaying the data related to the multimedia data.

* * * * *